H. A. V. Post,

Feed Water Heater.

No. 100,443.  Patented Mar. 1, 1870.

Witnesses

Inventor

United States Patent Office.

HENRY A. V. POST, OF CINCINNATI, OHIO, ASSIGNOR TO HIMSELF, JAMES H. SHELDON, AND JAMES T. STERLING.

Letters Patent No. 100,443, dated March 1, 1870.

IMPROVEMENT IN STEAM-GENERATORS.

The Schedule referred to in these Letters Patent and making part of the same.

*To all whom it may concern:*

Be it known that I, HENRY A. V. POST, of Cincinnati, in the county of Hamilton, and State of Ohio, have invented certain Improvements in Steam-Generators; and I do hereby declare that the following is a full, clear, and exact description thereof, reference being had to the annexed drawings making part of this specification, in which—

Figure 3 is an end view of the parts above alluded to.

Corresponding letters refer to corresponding parts in the several figures.

This invention relates to steam-generators; and

Figure 1:
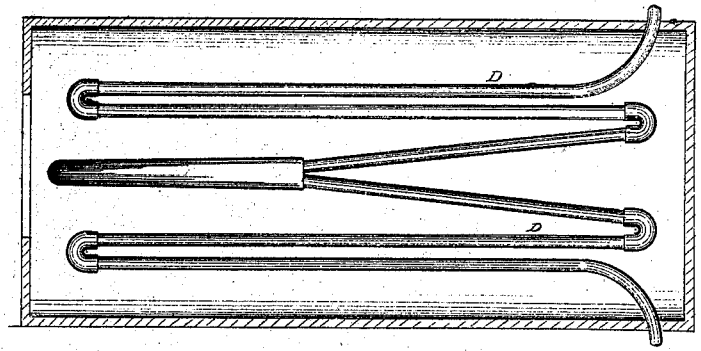
Figure 1 is a plan view of the heating-pipes, showing their arrangement within the furnace.

It consists in the construction, combination, and arrangement of the parts, as will be more fully described hereinafter.

It is a well-known fact that an active circulation of the water contained in a steam-generator greatly facilitates the generation of steam, and if such circulation is properly produced, it also results in increased economy of fuel. It is also believed to be a fact that a greater economy results from the fuel burned, when the water to which its heat is to be imparted, or by which it is to be absorbed, is divided into small volumes, than when such heat is expended upon large bodies of water.

It being well known that water is a slow conductor of heat, it follows that its position with reference to the surfaces from which it derives its heat should be changed as rapidly as possible, in order that the particles which have already been heated to or nearly to the evaporating point, may give place to other particles of a lower temperature, in order that the heat transmitted through the metal may be taken up as fast as thus transmitted and carried to other portions of the generator, to be converted into steam by the addition of more heat, should it be required.

My object is to produce a generator which shall effect the results above indicated, by fulfiling the conditions necessary thereto.

To enable those skilled in the art to make and use my invention, I will proceed to describe it with reference to the drawings.

A in the drawings refers to a steam-generator, which may be of any suitable construction, it being supplied with flues or tubes, for the passage of the heated products of combustion, after they have passed from the heating-pipes.

B refers to a furnace, which may be of the form shown, or of any other suitable construction, it being supplied with grates, upon which the fuel to be burned is placed, its upper surface consisting of an arch or diaphragm, B', the object of which is to confine the heat and keep it in contact with the heating-pipes, and to a certain extent reflect its heat upon such pipes, it being entirely different in this respect from those furnaces which are provided with perforated arches for the purpose of allowing the products of combustion to pass through into a combustion-chamber.

Figure 2:
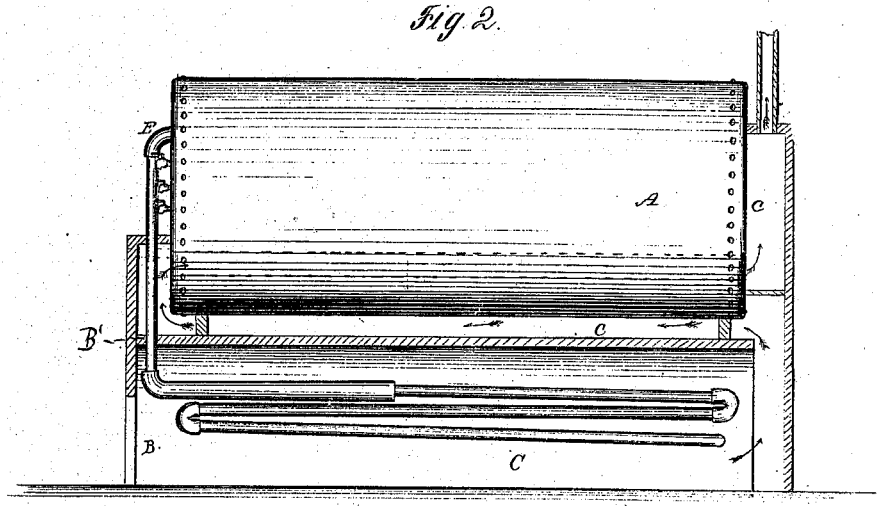
Figure 2 is a side elevation, showing the pipes in position, the generator to which they are attached, together with the manner in which they are attached, and the direction which the heated gases take in passing from the furnace to the atmosphere.

C refers to the flue, through which the products of combustion pass from the furnace to the atmosphere, its course being indicated by the arrows in fig. 2.

D D refer to heating-pipes, which receive their supply of water from the lower portion of the generator, and at a point near its rear end, the object being to take it from the point where the water is cooler than at any other point. These pipes may be arranged as shown in the drawings, so that the water shall be taken from the generator at two points, and be conducted through any desired length of pipe to a common vertical pipe, which conducts both streams or jets to the generator.

D' refers to the vertical pipe above referred to, it being united to the horizontal pipes in the manner shown in fig. 2, or in any other convenient manner. This pipe receives the water from both branches of the horizontal pipes, it which it has been made to pass forward and backward in the furnace, and in close proximity to the burning fuel, until it has become highly heated, and delivers it through the elbow E to the steam-generator, at a point above the level of the water in such generator.

Figure 3:
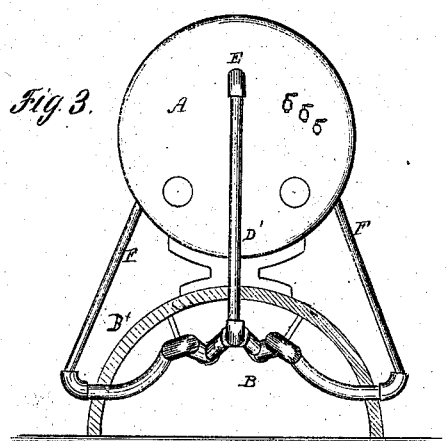

F F refer to the pipes which connect the heating-pipes D D with the generator, their arrangements for that purpose being clearly shown in fig. 3.

The operation of this device is as follows:

The generator having been filled with water to the proper height, it flows into and fills the heating-pipes, after which a fire is kindled, which soon heats the water in these pipes to an extent sufficient to cause it to flow up through the vertical pipe D' into the upper portion of the generator, and the cold water flows in through the branch-pipes F F, to supply the place of that expelled.

It will be seen that while the water is passing the point of greatest effect of the fire, it is divided into small streams or bodies, and that the conduits through which it passes are entirely surrounded with the flame from the fuel, and thus their entire area becomes heating-surface.

After the water has been heated in the pipes, it is delivered to the upper portion of the generator, so that the steam which rises therefrom is not condensed or cooled to any extent by coming in contact with the cooler water in the generator.

After all the heat has been absorbed by the heating-pipes, which are capable of taking up in the time allowed, the heated products of combustion pass on to the rear of the generator, and up through a vertical flue to and along the horizontal flue underneath such generator to the front end thereof, whence they are conducted to the flues or tubes which pass through such generator, and then out into a vertical flue, which delivers them into the atmosphere, thus, as will be seen, aiding in the production of steam within the generator.

The furnace is separated from the generator by a partition or an arch, which may be of any suitable material, the object being to confine the heat as much as possible to the heating-pipes, in order that the difference in temperature between them and the water in the generator may be as great as possible, so as to make the movement of the water through the pipes as rapid as it can well be.

One great advantage indirectly growing out of this improvement is the prevention of the deposition of scale upon the interior of the generator, as the rapid motion of the water will not permit it to remain in a state of rest for a sufficient length of time to permit such deposition to be made.

The generator is to be supplied with the usual apparatus for supplying it with water, and the usual blow-off cock for discharging the water therefrom.

Having thus described my invention,

What I claim, and desire to secure by Letters Patent, is—

1. Arranging the heating-pipes in a furnace or flue, which is separated from the generator by means of an arch or a partition, substantially as and for the purpose specified.

2. The combination and arrangement of the generator A, heating-pipes D D, and dividing-arch or partition C', substantially as and for the purpose specified.

In testimony of which invention, I hereunto set my hand.

HENRY A. V. POST.

Witnesses:
ENOCH B. TRUMBULL,
JOHN T. CASSILLY.